Patented Dec. 18, 1934

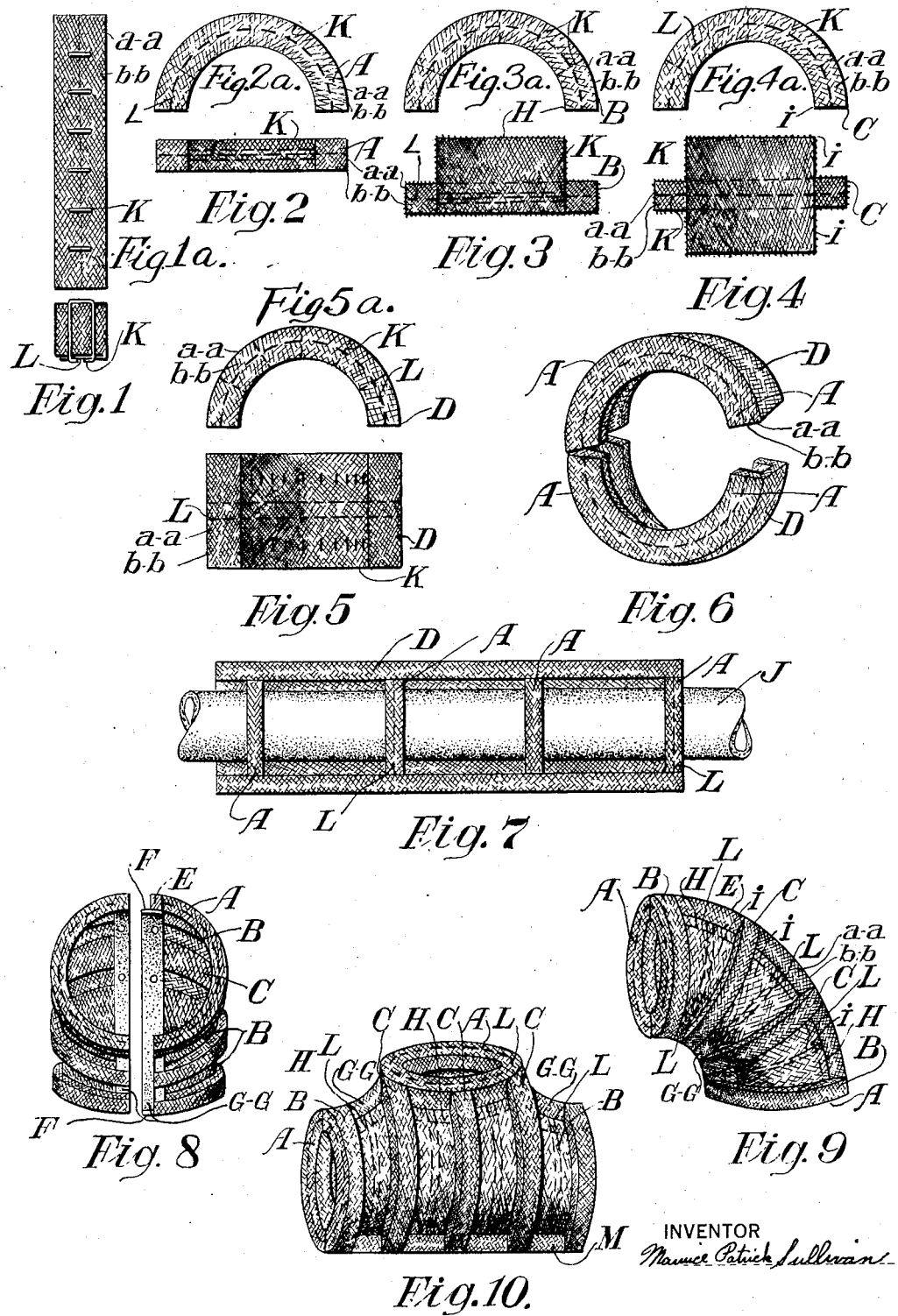

1,984,848

UNITED STATES PATENT OFFICE 1,984,848

INSULATION FRAMEWORK

Maurice Patrick Sullivan, Brooklyn, N. Y.

Application November 21, 1932, Serial No. 643,566

3 Claims. (Cl. 154—44)

The principal object of the invention is the production of a suitable sectional framework that will fit the various styles of flanged fittings and flanges for nonconducting material to be applied on and cause same to be capable of being removed and replaced.

Another object of the invention is the production of a fireproof heat resisting material encased in a tubing of expanded metallic lath for the production of the several members that constitutes the assembled framework.

A further object of the invention is the production of a framework that is fireproof and heat resisting and capable of withstanding vibration on high pressure piping flanged fittings and flanges without disintegrating and of being bent and rolled into various shapes to fit the contour of flanged fittings and flanges or any heated surfaces to which they are applied.

A principal object of the invention is the production of a suitable flexible heat resisting material encased in a tubing of expanded metallic lath for the construction of a skeleton sectional framework for flanged fittings, flanges, and piping to act as a form and foundation for nonconducting insulation to be applied on and cause same to be capable of being removed and replaced in case of leaks or putting new gaskets in flange joints.

In the accompanying drawing

Fig. 1 shows a square longitudinal sectional view of high temperature material encased in a tubing of expanded metallic lath to be used as a straight or horizontal member of structural framework.

Fig. 2 shows a semicircular member of framework of high temperature material encased in a tubing of expanded metallic lath to be used as ribs for a structural framework.

Fig. 3 shows a semicircular member of high temperature material encased in a tubing of expanded metallic lath having one wing of said lath projecting from side.

Fig. 4 shows a semicircular member of high temperature material encased in a tubing of expanded metallic lath having wings of said lath projecting from each side.

Fig. 5 shows an enlarged section of high temperature material encased in expanded metallic lath.

Fig. 6 shows a sectional cover for flanges having sectional collars of encased high temperature material attached to sides of said cover.

Fig. 7 shows a section of high pressure steam pipe having rings or collars of high temperature material encased in metallic lath and spaced at intervals along pipe and an outside shield applied over said collars for the formation of a dead air space between said collars and surrounding shield.

Fig. 8 shows an assembled frame work of encased high temperature material for flanged elbow and view of interior.

Fig. 9 shows an elevational side view of framework for flanged elbow assembled.

Fig. 10 shows an elevational side view of framework for a flanged T assembled.

In the production of sectional removable and replaceable heat insulation for flanged fittings and flanges and sundry apparatus in power plants where insulation on the heated surfaces has to be removed and replaced in case of leaks and putting in new gaskets. It has always been a difficult matter to fabricate or build up a covering for same that would stand up, for upon their removal of flange or fitting they generally collapsed and fell apart. It became evident that a structural frame was required to support and sustain the heat insulation proper and hold it in its original shape after it had been removed so that it could be replaced in its previous position. A metal frame would not suffice it being a conductor of heat.

Therefore the object of this invention is the production of a light flexible frame largely composed of high temperature resistant material reinforced by being enclosed preferably in a casing of expanded metallic lath and formed into the various curvatures or semicircles in the nature of ribs to give strength to the assembled structural frame. The object of using the metallic lath as a casing for the high temperature resistant material is in its peculiar qualities that being compressed around the material in straight or horizontal slabs it is capable of being rolled into circular or semicircular form without breaking or cracking. This is caused by the outer meshes of the expanded metallic lath expanding and contracting gradually and proportionately towards the inner side of circle during the rolling process. In assembling the various members constituting a framework a system of interchangeable molds of elbows, T's, valves, flanges etc., is provided of all the various sizes straight or reducing and is mounted on a special form so that frames can be assembled for the size fitting desired and built into shape on mold.

In the accompanying drawing which illustrates certain embodiments of the invention and wherein similar characters of reference indicate corresponding parts in all the views.

In the basic formation of the framework Fig. 1 shows a square longitudinal segment of framework. The high temperature resistant material b—b is encased in a tubing of expanded metallic lath a—a and clinched together by means of staples K at overlap L. The high temperature resistant material b—b enclosed in said lath tubing a—a is composed of 50% asbestos fibre, 20% magnesia and 30% fire clay forming a stiff plastic composition.

The fabricated material is then rolled into semicircular forms as shown in Figures 2—3—4 and 5 and designated as members A. B. C. and D. The semicircular member B Figure 3 is equipped with a single wing H of expanded metallic lath A. A. extending outwardly from the inner sides and attached thereto. The enlarged member D as shown in Figure 5 provides the outer casing for flanges and piping as shown in D. D. Figure 6 and into which 4 members A as shown in Figure 2 is attached at K to each side of members D Figure 6. The members A are turned inwardly so that they rest on pipe when applied.

Figures 8 and 9 show an elevational face and side view of an assembled frame work for flanged elbow an arc form of members E. E. is placed in position and follows the contour of back of elbow, and curved members G. G. are placed in their respective positions circumferentially over body of mold and abut against members E. E. and G. G. and attached securely thereto, each members B and C having their wings I and H overlap each other at L. Semicircles of member A Figure 1 are then attached to the rest on pipe insulation when applied occasion arises however, where flanged fittings are bolted to each other in such cases the frames terminate at the face of fitting or at gasket and members A are omitted as the following frame meets and abuts against it, each fitting in such cases carrying their own individual cover.

On the inner side of member E there is attached a nonconducting shield F acting as a lap joint and prevents heat from escaping through the joint between both members E. E.

Figure 10 shows a side elevational view of an assembled framework for flanged T. Horizontal members as shown in Figure 1 and designated by the letter M are placed at the lower portion or back of T and curved members G. G. are placed in position at each side of the side outlet. The members B and C are placed in their respective positions and abut against the members M and G and attached thereto their respective wings. I and H overlapping each other. A central member C is placed in position and abuts against members M and B at side outlet and attached securely thereto. Members A as shown in Figure 2 are then attached to the inside of members B at each end of T or at face of side outlet as required as occasion arises as stated before where they are omitted.

In Figure 7 is shown a section of steam pipe J having several members A as shown in Figure 2 applied at intervals along pipe J and enlarged section D as shown in Figure 5 is then placed over and rests on the several members A. This method forms a series of dead air chambers along steam pipe J same as is obtained between flanges on fittings where the framework bridges over the space across from flange to flange creating a dead air chamber between. Various changes in the form of framework may be resorted to without departing from the spirit and scope of the invention.

Having thus described my invention what I claim as new and desire to secure by Letters Patent.

1. The combination of a fire proof and heat resisting material compressed into a tubing of expanded metallic lath and formed and rolled into semicircular members having wings of said lath projecting from one or more sides for the formation and construction of a sectional framework for flanged fittings and flanges for nonconducting material to be applied on causing same to be capable of being removed and replaced as and for the purpose described.

2. A skeleton structural framework constructed in two half sections and built up and connected to fit the contour of flanged T's, flanged elbows, flanged valves and flanged joints in general, on steam pipe each and every member constituting framework, to be composed of fire resisting and non-conducting composition compressed and encased in a tubing of metallic lath, each member provided with one or two wings of said lath, projecting outwardly from sides and which overlap the wings of lath on adjacent members and both wings attached together, forming a completed structure, to sustain and hold in rigid formation 85% magnesia or other non-conducting material required for heat insulation, and capable of being removed and replaced without injury, as and for the purposes described.

3. The combination of a series of semi-circular or circular members mounted on steam pipe between flanged fittings, each member composed of fire resisting and non-conducting composition compressed and encased in a tubing of metallic lath, and segments of insulation encased in metallic lath, applied over the circular members, thus creating a series of dead air chambers as an effective means of insulation on pipe between fittings, as and for the purposes described.

MAURICE PATRICK SULLIVAN.